UNITED STATES PATENT OFFICE.

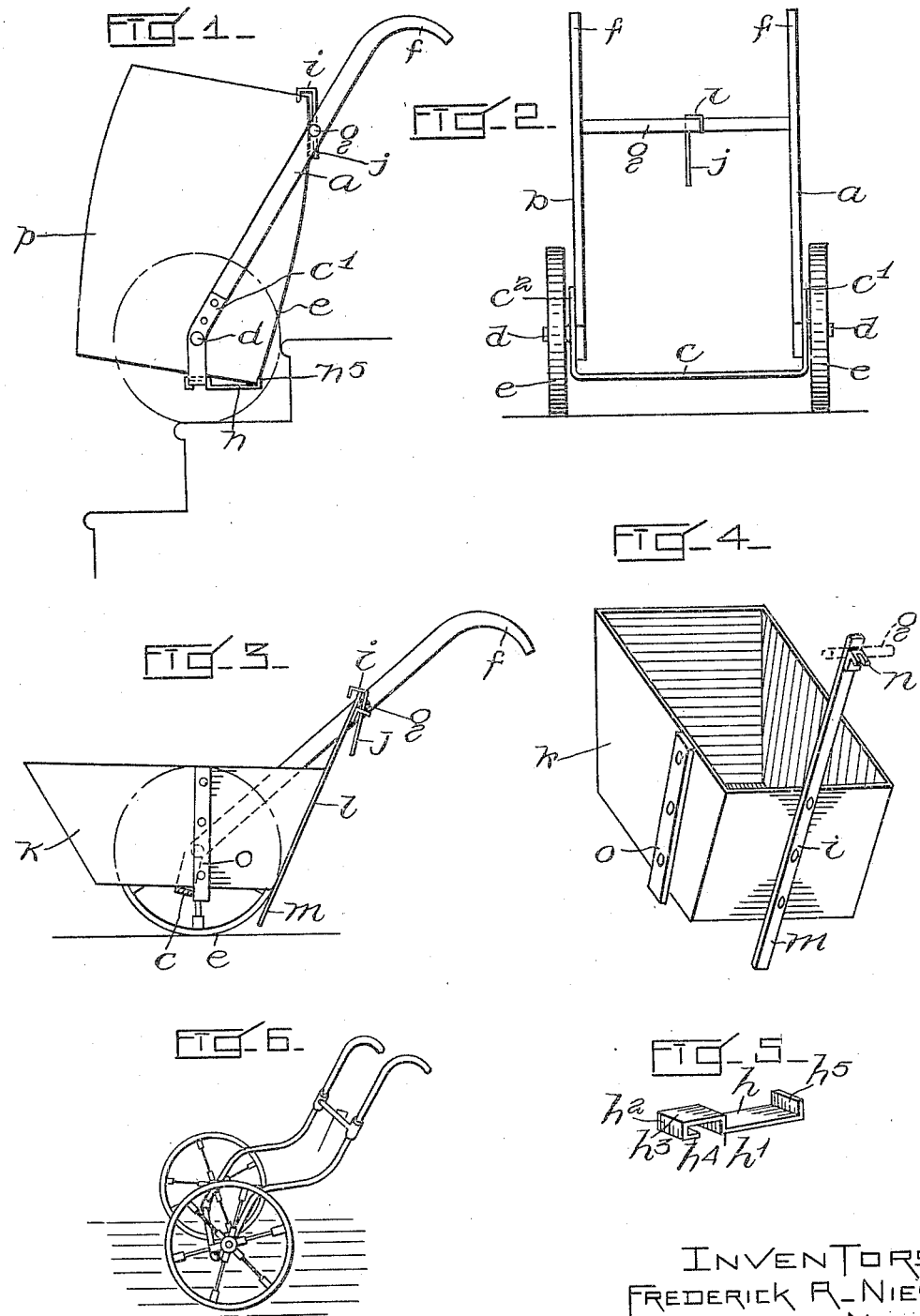

FREDERICK R. NIES, OF SALEM, AND MARTIN E. NIES, OF SWAMPSCOTT, MASSACHUSETTS.

CONVERTIBLE BARROW AND TRUCK.

1,319,530. Specification of Letters Patent. Patented Oct. 21, 1919.

Application filed March 20, 1916. Serial No. 85,439.

*To all whom it may concern:*

Be it known that we, FREDERICK R. NIES and MARTIN E. NIES, citizens of the United States, residing at Salem and Swampscott, respectively, in the county of Essex and State of Massachusetts, have invented new and useful Improvements in Convertible Barrows and Trucks, of which the following is a specification.

The present invention relates to a truck adapted to be used for transporting such containers as barrels, boxes, etc., and capable of being converted into a wheelbarrow. The invention consists therefore both in the truck and in the combination of the truck with a body or hopper, such combination constituting a wheelbarrow.

In the accompanying drawings we have illustrated the two aspects of the invention, one illustrated aspect being as a truck adapted to support and carry a barrel, and the other as a wheelbarrow.

Figure 1 shows a side view of the truck with a barrel associated therewith.

Fig. 2 is a front view of the truck alone.

Fig. 3 is a partial side elevation and partial section of the combination constituted by the truck and a body, constituting a wheelbarrow.

Fig. 4 is a perspective view of the body detached from the truck.

Fig. 5 is a perspective view of a detachable part of the truck.

Fig. 6 is a side elevation of a modified form of the truck.

The same reference characters indicate the same parts in all the figures.

Referring to the drawings the truck comprises essentially a frame and two wheels. The frame is composed of the two side bars $a$, $b$, and a transverse beam $c$. Axle studs $d$ are secured to the outer sides of the frame above said beam, and upon these studs are mounted the wheels $e$ of the truck. Conveniently and preferably the transverse beam $c$ is made of a bar or strap of metal, preferably wrought iron with the ends bent up, to form a wide U. The side bars are preferably made of wood with their extreme ends bent over to form handles $f$ and are set against the inner sides of the bent up ends $c'$ and $c^2$ of the strap or beam, and riveted thereto. This construction may be modified, however, as will presently appear.

A rung $g$ passes between the side bars and is secured at its ends in the bars in a manner common to constructions of this sort. The extremities of the end portions $c'$ and $c^2$ of the transverse beam to which the side, or handle, bars are attached are inclined rearwardly, as appears in Figs. 1 and 3, whereby it is possible to incline the side bars $a$ and $b$ with respect to the cross beam, and thus to locate the rung $g$ so far in rear of the beam $c$ as to leave room for placing a barrel or other body to be carried, so that its center of gravity is over the crossbeam, or nearly so, when the truck is held in the position shown in Fig. 1, which is that assumed when the truck is wheeled over stairs.

The axle studs are secured, in any desired way which will make them sufficiently secure, to the upturned end portions of the beam. Preferably their location is at a substantial distance above the beam, whereby it follows that the beam is depressed below the axial line of the wheels.

When a barrel $p$, or a box or other body is mounted on the truck its bottom is placed upon the beam $c$ and it is otherwise so placed that its rear side bears against the rung $g$. The latter thus acts as a gage to limit the insertion of the barrel into the space between the side bars of the frame, and also as a support to keep the barrel from tipping over backward. Another gage $h$, later described in detail, is provided to limit the entrance of the bottom of the barrel between the sides of the frame. When so placed the center of gravity of the barrel is nearly over the beam $c$, and preferably is between the vertical planes passing through the wheel axes and the rung $g$, respectively, whereby it is stably cradled in the truck.

The member which we have designated above as the gage $h$ is shown in Fig. 5. It is adapted to be placed on the cross beam $c$ about the middle thereof, and to be detached therefrom. For this purpose such gage is provided with members $h'$ and $h^2$ adapted to embrace the cross beam $c$, and a web $h^3$ connecting said members and lying over the cross beam. A lip $h^4$ underlies one edge of the cross beam far enough to make the attachment of the gage secure. The lip $h^5$ is the gage abutment which is upturned from its rear end to engage the rear edge of the barrow abutment. Preferably we make this gage member out of a strap of iron or other metal, which is bent up into approximately the form shown to provide the members or elements above described. The material of which it is made has sufficient flexibility and elasticity to enable the gage to be placed on and removed from the cross beam easily, while at the same time it is sufficiently stiff, and the members $h'$, $h^2$, $h^3$, and $h^4$ embrace the cross beam closely enough so that the gage will not accidentally drop off. As the cross beam is non-circular in section the contact of the gripping members of the gage with the sides of such cross beam cause the gage to assume and retain the position shown in Fig. 1, where its abutment lip $h^5$ is in rear of the cross beam. The location of the gage abutment $h^5$ is such that it prevents the bottom of the barrel from projecting beyond the rims of the wheels so that the barrel will not interfere with stairs when the truck carrying a barrel is raised or lowered over a flight of stairs.

A means for preventing the barrel from leaving the truck in case the latter should be tilted forward, is provided in the shape of a hook $i$ which is adapted to engage over the rim of the barrel and has a shank $j$ passing through the rung. The hook may be raised, its shank then sliding through the hole in the rung wherein it is contained, and may then be placed over the rim of the barrel.

The truck constructed essentially as hereinbefore described is adapted to be used in carrying a barrel over a flight of stairs, and this capacity is an important advantage of the invention. So far as we are aware the mechanical features of our truck which contribute to this result, are the large wheels of which the diameter is great enough to enable the truck to be wheeled easily over a flight of stairs, the width between the side bars, the depression of the cross beam or bottom of the frame below the wheel axis, and the rearward inclination of the handle bars; and the abutment gage which prevents interference of the barrel bottom with the lips of the stairs. The inclination of the handle bars is important as the location of the rung $g$ permitted thereby is so far in rear of the vertical plane through the wheel axis when the truck is in the position most convenient for being drawn over stairs, that the load is located with its center of gravity approximately over the wheel axis, whereby the truck and load together are perfectly balanced. In this position of the truck the cross beam or bottom bar $c$ of the frame is in approximately vertical alinement with the wheel axis, whereby the weight of the load acts directly downward on the wheels with no tendency to tilt the truck. Without intending any limitation of the invention, we will say that we have used in trucks built according to the foregoing description wheels having a diameter of 16 inches and the bottom bar of the frame has been placed about midway between the axis and bottom sides of the wheels.

The contrivance hereinbefore designated as a truck and having the characteristics above described is particularly well adapted for domestic use as an ash hoisting carrier for conveying barrels or ash cans from the cellar of a dwelling house. To such use all of the characteristics herein disclosed of the carrier contribute. The depressed bottom bar allows the barrel to be easily placed upon the carrier; the particular inclination of the handle bars and the width of spread between them enables the barrel or can to be placed with its center of gravity substantially vertically over the wheel axis when the handles are in position to be grasped by a man standing on the stairs one or two steps above the step on which the wheels rest, and thereby the line of draft is made the most efficient for hoisting the carrier with its load over the stairs, while the balance of the load insures against its falling back down the stairs; and the wheels are of a radius which brings their rims beyond the bottom edge of the barrel whereby they are enabled to bear upon the edge of a stair and the barrel is prevented from interfering with the stair when the carrier is hoisted; while such radius is less than the width of tread and preferably somewhat greater than the rise of the steps commonly provided in the outer cellar stairs of dwelling houses, whereby the entire weight of the carrier and its load may be supported by each step in turn, relieving the operator of the effort of continuously supporting a part of this weight, and the wheels are also adapted to roll over the edge of the next higher step without being pocketed under the lip of the step. Thereby the householder who is in possession of such a carrier is enabled to hoist ashes or other rubbish from his cellar with the maximum convenience and the minimum of muscular effort. In this connection it is of particular value that he may rest the entire weight of the load on each step for as long a time as he may desire, without need of constantly exerting strength to prevent the truck from rolling down stairs.

In converting the truck into a wheelbarrow a body or hopper $k$ is mounted on the supporting beam $c$ of the truck and connected with the frame detachably, but yet in a sufficiently permanent manner to prevent accidental dislodgment. The body here shown has a flat bottom, substantially upright side walls, and inclined front and rear walls, its upper side being open. The form and proportions may, however, be changed without departing from the spirit of the invention, provided only that the body is so constructed that it may be placed upon the cross beam of the frame and between the side bars thereof. A rigid bar or post $l$ is secured to the rear wall of the body in such manner, and of such a length, that it projects above the body to engage with the rung of the truck frame and constitutes a connector between said rung and the body; and its lower end projects beyond the bottom of the body to form a foot $m$. The connection between the bar $l$ and rung $g$ is made by the hook $i$ previously described, which engages over the end of this bar, and by a lip $n$ projecting rearwardly from the bar under the rung. Said lip lies so close to the rung as to form a stop preventing the body from being tilted forward with respect to the frame; and it is slotted to receive the shank of the hook.

Sliding of the body forwardly when the barrow is tilted forward is prevented by cleats $o$ secured to the sides of the body and projecting below the bottom thereof in rear of the cross beam $c$. The foot $m$ comes in contact with the ground when the barrow is slightly tilted to the rear and then constitutes in combination with the wheels, a three point base stably supporting the barrow.

The device produced by the combination of the truck and body last described is adapted to serve the uses of a wheelbarrow in transporting loose material, and may be tilted to discharge its contents. It has the advantage over the ordinary wheelbarrow in that it can be discharged in tilting forwardly instead of sidewise, being enabled therefore to discharge its contents into a trench or a hole in the ground without being turned side on to the trench. In filling material into a trench with the use of an ordinary wheelbarrow the loaded barrow must be brought up to the trench and turned before being tilted to discharge its contents. This brings the wheel near the edge of the trench, and it is usually a difficult matter to bring the body of the barrow into the right position without causing the trench to cave in, particularly as the entire weight of the loaded barrow is concentrated on one wheel. Our barrow, however, may be brought directly up to a trench at the point where its load is to be dumped, and then it may be dumped by simply tilting it forward and without turning it, the weight of the load being distributed upon two wheels, neither of which need be brought so near the trench as to risk a caving in of its wall.

While the barrow constituted as above described is sufficiently permanent for all of the purposes of a wheel-barrow it may be disassembled and converted into a truck readily by disengaging the hook $i$ and lifting the body from the frame.

The modification shown in Fig. 6 illustrates essentially the same truck differening from that hereinbefore described in two particulars only; one being that the frame is constructed of tubing or pipes, the parts of which are connected by ordinary pipe couplings, and the other being in the form of the frame. Such form differs in that the bottom transverse bar is mounted on the ends of the side bars, which extend straight across the wheel axes, and that said bars are offset between the wheel axes and their upper ends.

What we claim and desire to secure by Letters Patent is:

1. A carrier for conveying and hoisting ash barrels over stairs comprising a frame having side bars with handles at their ends and a transverse bottom bar, and wheels, said frame being of width sufficient to admit a barrel between the bars in a position where its center of gravity is substantially vertically above the wheel axis when said bars are at the inclination for most efficient application of force to their handle portions tending to hoist the carrier over stairs; the wheels being mounted on the outer sides of the frame with their axes in the line of draft applied through said bars, and their rims extending beyond the bottom of a barrel placed as above set forth, at the side of the wheel axis toward which said bars extend.

2. A barrel truck comprising side bars separated widely enough to admit a common barrel between them, a cross beam joining the lower ends of the side bars adapted to support a barrel, wheels mounted on the outer sides of the side bars, a rung extending from one side bar to the other at a height above the cross beam less than the height of the barrel, against which the side of the barrel may rest, and a retainer connected with said rung to engage the lip of a barrel so placed, to retain the barrel on the truck; in combination with a removable hopper adapted to be placed on said cross beam, having a post rising at one of its ends in position to bear on said rung and engage said retainer.

3. A barrel truck comprising side bars separated widely enough to admit a common barrel between them, a cross beam joining the lower ends of the side bars adapted to support a barrel, wheels mounted on the outer sides of the side bars, a rung extending from one side bar to the other at a height above the cross beam less than the height of the barrel, against which the side of the barrel may rest, and a retainer connected with said rung to engage the lip of a barrel so placed, to retain the barrel on the truck; in combination with a removable hopper adapted to be placed on said cross beam, having a post rising at one of its ends in position to bear on said rung and engage said retainer and having also a projection extending below its bottom between the cross beam and rung to prevent said hopper from sliding away from the rung.

4. A barrel carrier comprising a frame having a bottom bar and upwardly extending side bars spread apart sufficiently to admit between them the lower part of a barrel resting on said bottom bar, and wheels pivoted to the side bars; the said frame having means to bear against the upper part of a barrel placed upon the bottom bar, positioning such barrel, when the side bars are inclined at an acute angle to the vertical, with its center of gravity directly over the wheel axis, and said wheels having a radius greater than the rearward extent of the barrel bottom from the wheel axis when in the position above described, but less than the tread width of a common stair.

5. A wheel barrow comprising a frame having side bars, a connecting bottom bar, and a transverse rung, wheels mounted on said side bars, a hopper resting on the bottom bar between the side bars having a bottom, and front, side, and rear walls, and having an upwardly extending member rising from the rear wall and bearing against said rung, and a hook supported by said rung engaging the upper end of said member.

In testimony whereof we have affixed our signatures.

FREDERICK R. NIES.
MARTIN E. NIES.